No. 791,133. PATENTED MAY 30, 1905.
C. W. BOOTH.
CATTLE GUARD.
APPLICATION FILED MAR. 17, 1905.
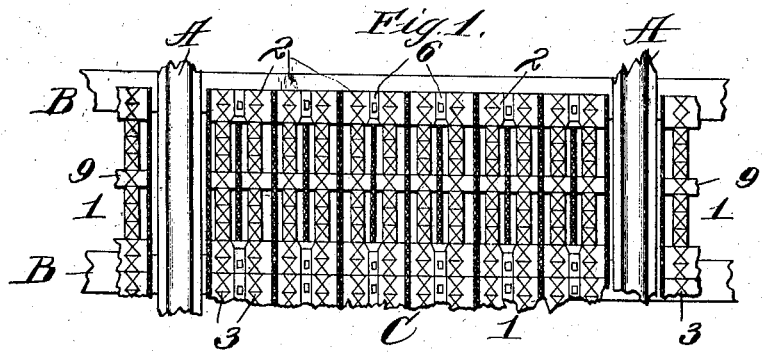
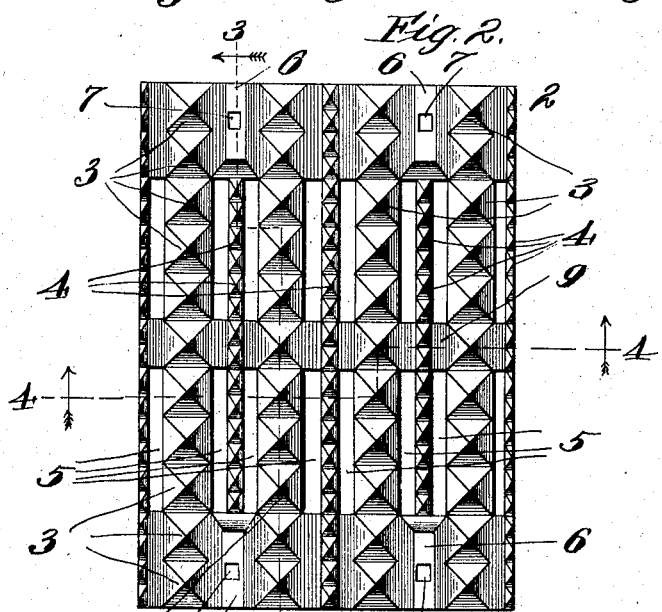
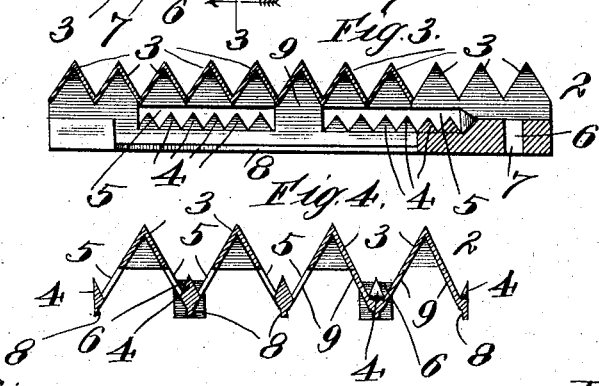
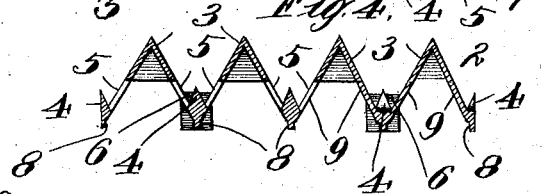
Witnesses:
G. A. Pauberschmidt
A. H. Pepke
Inventor:
Charles W. Booth,
By Geo. E. Waldo,
Atty.

No. 791,133. Patented May 30, 1905.

UNITED STATES PATENT OFFICE.

CHARLES W. BOOTH, OF MILWAUKEE, WISCONSIN, ASSIGNOR OF ONE-HALF TO ALFRED L. STREETER, OF CHICAGO, ILLINOIS.

CATTLE-GUARD.

SPECIFICATION forming part of Letters Patent No. 791,133, dated May 30, 1905.

Application filed March 17, 1905. Serial No. 250,647.

*To all whom it may concern:*

Be it known that I, CHARLES WEBSTER BOOTH, a citizen of the United States, and a resident of Milwaukee, in the county of Milwaukee and State of Wisconsin, have invented certain new and useful Improvements in Cattle-Guards, of which the following is a specification.

This invention relates to cattle-guards.

Primary objects of the invention are to provide a cattle-guard which will be of simple and cheap construction, which may be conveniently and quickly installed, removed, or renewed in whole or in part, and which will be strong, durable, and effective.

To this end a cattle-guard of my invention consists of the various features, combinations of features, and details of construction hereinafter described and claimed.

In the accompanying drawings, in which a cattle-guard of my invention is fully illustrated, Figure 1 is a partial top plan view of a railroad-track with a cattle-guard of my invention applied thereto. Fig. 2 is an enlarged plan view of one of the sections of my improved cattle-guard. Fig. 3 is a sectional view thereof on the line 3 3 of Fig. 2, and Fig. 4 is a sectional view thereof on the line 4 4 of Fig. 2.

Referring now to the drawings, Fig. 1, A designates the rails of a railroad-track; B, the ties on which said rails are supported, and C designates as a whole a cattle-guard of my invention, said cattle-guard being designed to be flanked on both sides by a fence (not shown) in the usual manner.

A cattle-guard of my invention consists of plates 1, the upper surfaces of which are coarsely corrugated, as best shown in Fig. 4. While said plates may be made of any desired size, I prefer to make the same of a plurality of sections 2 of such size that they may be conveniently handled, one of said sections being shown on an enlarged scale in Fig. 2. Formed at the tops and bottoms of the corrugations in said plates 1 are spines or sharp projections 3 and 4. The spines or projections 4 at the bottoms of the corrugations are relatively short, and formed in the inclined sides of said corrugations are longitudinal holes or openings 5, which preferably extend both above and below the tops of said spines or projections 4. With this construction it is obvious that an animal attempting to cross said cattle-guard will find no support for its feet excepting the spines or projections 3 and 4, as the openings 5 in the inclined sides of said corrugations, extending, as they do, both above and below the tops of the spines or projections 4 at the bottoms of said corrugations, will throw the entire weight of the animal upon the sharp ends of said spines or projections. A further advantage, due to the holes or openings 5, is that they provide ventilation for the road-bed beneath the cattle-guard and permit the free evaporation of water and moisture which may accumulate thereunder, thereby preventing to a great extent rapid decay of the ties.

To provide for securing the plates 1 in position, they are provided with flat portions 6, designed to rest upon the ties and which are provided with spike-holes 7, through which spikes may be driven into the ties. As shown, flat supporting-surfaces 6 are formed at both ends of each section 2, so that each section may be removed and replaced independently of the others.

I prefer to make my improved cattle-guard of malleable iron and to corrugate the under side thereof in the same manner as the upper surface, as clearly shown in Figs. 3 and 4, forming a skeleton structure, thus greatly reducing the weight thereof and correspondingly lessening the cost, while at the same time providing adequate strength. The portions of said plates at the bottoms of the corrugations on which the spines or projections 4 are formed are comparatively light, and I prefer to reinforce or strengthen the same by ribs 8 on the under sides thereof and also to connect the same with the upper and heavier portions of said plates by integral webs 9. Constructed in this manner it is obvious that said plates will be amply strong to sustain any weight to which they may be subjected, that they will be comparatively inexpensive, will be very durable, and may be quickly and conveniently installed and removed or renewed, either in whole or in part, all in the manner desired.

In order to protect my improved cattle-guard from corrosion, either by the action of the elements or from droppings from the engines and cars passing over the road, I prefer to cover them with a coating of suitable mineral paint, asphaltum, or the like.

I claim as my invention—

1. A cattle-guard comprising plates, the upper surfaces of which are coarsely corrugated, said plates being provided with longitudinal holes or openings in the inclined sides of said corrugations.

2. A cattle-guard comprising plates, the upper surfaces of which are coarsely corrugated and which have spines or sharp projections at the tops of said corrugations, said plates being provided with longitudinal holes or openings in the inclined sides of said corrugations.

3. A cattle-guard comprising plates the upper surfaces of which are coarsely corrugated and which have spines or sharp projections at the tops and bottoms of the corrugations therein, said plates being provided with longitudinal holes or openings in the inclined sides of said corrugations.

4. A cattle-guard comprising plates, the upper surfaces of which are coarsely corrugated and which have spines or sharp projections at the bottoms of the corrugations therein, said plates being provided with longitudinal holes or openings in the inclined sides of said corrugations which extend both above and below the tops of the spines or projections at the bottoms of the corrugations in said plate.

5. A cattle-guard comprising plates, the upper surfaces of which are coarsely corrugated and which have spines or sharp projections at the tops and bottoms of the corrugations therein, said plates being provided with longitudinal holes or openings in the inclined sides of said corrugations which extend both above and below the tops of the spines or projections at the bottoms of the corrugations in said plates.

In testimony that I claim the foregoing as my invention I affix my signature, in presence of two subscribing witnesses, this 15th day of March, A. D. 1905.

CHARLES W. BOOTH.

Witnesses:
A. L. STREETER,
K. A. COSTELLO.